United States Patent
Adachi et al.

(10) Patent No.: US 10,126,922 B2
(45) Date of Patent: Nov. 13, 2018

(54) ON-BOARD UNIT AND FAULT DETERMINATION METHOD

(71) Applicant: MITSUBISHI HEAVY INDUSTRIES MECHATRONICS SYSTEMS, LTD., Kobe-shi, Hyogo (JP)

(72) Inventors: Tetsuya Adachi, Tokyo (JP); Ryota Hiura, Tokyo (JP); Takeshi Fukase, Tokyo (JP); Takuma Okazaki, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/510,141

(22) PCT Filed: Sep. 10, 2014

(86) PCT No.: PCT/JP2014/073989
§ 371 (c)(1),
(2) Date: Mar. 9, 2017

(87) PCT Pub. No.: WO2016/038707
PCT Pub. Date: Mar. 17, 2016

(65) Prior Publication Data
US 2017/0277375 A1 Sep. 28, 2017

(51) Int. Cl.
*G06F 3/0484* (2013.01)
*G07C 5/00* (2006.01)
(Continued)

(52) U.S. Cl.
CPC .......... *G06F 3/0484* (2013.01); *G06F 3/0487* (2013.01); *G06F 11/0739* (2013.01);
(Continued)

(58) Field of Classification Search
CPC .... G06F 3/0487; G06F 11/0739; G06F 13/16; G06F 17/00; G07C 5/0816
See application file for complete search history.

(56) References Cited

U.S. PATENT DOCUMENTS

| 2004/0203390 | A1 | 10/2004 | Inoue |
| 2012/0104844 | A1* | 5/2012 | Koiso ................... G08G 1/094 307/9.1 |

(Continued)

FOREIGN PATENT DOCUMENTS

| JP | 2000-076503 A | 3/2000 |
| JP | 2004-320214 A | 11/2004 |

(Continued)

OTHER PUBLICATIONS

PCT/ISA/210, "International Search Report for International Application No. PCT/JP2014/073989," dated Oct. 28, 2014.

(Continued)

*Primary Examiner* — Michael D Lang
(74) *Attorney, Agent, or Firm* — Manabu Kanesaka; Benjamin Hauptman; Kenneth Berner

(57) ABSTRACT

This on-board unit is an on-board unit that is attached to a vehicle, stores information about the vehicle, and performs a process using the information about the vehicle, and includes a state information acquisition unit that acquires state information indicating a state of the on-board unit, a storage unit management unit that stores state information in a storage unit when the on-board unit is powered off, and a fault determination unit that determines whether or not state information acquired when the on-board unit is powered on matches the state information stored in the storage unit, and determines a fault when the fault determination unit deter- (Continued)

mines that the state information acquired when the on-board unit is powered on does not match the state information stored in the storage unit.

7 Claims, 7 Drawing Sheets

(51) Int. Cl.
*G06F 3/0487* (2013.01)
*G06F 11/07* (2006.01)
*G06F 13/16* (2006.01)
*G06F 17/00* (2006.01)
*G07C 5/08* (2006.01)
*H04L 12/40* (2006.01)

(52) U.S. Cl.
CPC .............. *G06F 13/16* (2013.01); *G06F 17/00* (2013.01); *G07C 5/00* (2013.01); *G07C 5/0816* (2013.01); *H04L 2012/40215* (2013.01)

(56) References Cited

U.S. PATENT DOCUMENTS

| | | | |
|---|---|---|---|
| 2012/0254989 A1* | 10/2012 | Levien | G06F 3/0346 726/19 |
| 2015/0088455 A1 | 3/2015 | Yamashita | |

FOREIGN PATENT DOCUMENTS

| | | |
|---|---|---|
| JP | 2008-033738 A | 2/2008 |
| JP | 2009-116480 A | 5/2009 |
| JP | 2012-094076 A | 5/2012 |
| JP | 5419496 B2 | 2/2014 |
| WO | 2010/101013 A1 | 9/2010 |
| WO | 2014/020647 A1 | 2/2014 |

OTHER PUBLICATIONS

PCT/ISA/237 "Written Opinion of the International Searching Authority for International Application No. PCT/JP2014/073989," dated Oct. 28, 2014.

\* cited by examiner

ON-BOARD UNIT AND FAULT DETERMINATION METHOD

RELATED APPLICATIONS

The present application is National Phase of International Application No. PCT/JP2014/073989 filed Sep. 10, 2014, the disclosure of which is hereby incorporated by reference herein in its entirety.

TECHNICAL FIELD

The present invention relates to an on-board unit and a fault determination method.

BACKGROUND ART

An on-board unit may store information about a vehicle to which the on-board unit itself is attached and perform a process using the information. For example, in a case in which a fee for a toll road is set for each type of vehicle such as a large vehicle, an ordinary vehicle, and a two-wheeled vehicle, an on-board unit of a road billing system stores vehicle type information of the vehicle to which the on-hoard unit itself is attached, thereby enabling automatic billing in accordance with the type of vehicle.

If the on-board unit that stores information about a vehicle is used in another vehicle, a process may not be performed correctly. For example, if an on-board unit that stores information about a motorcycle is transferred from the motorcycle to an ordinary vehicle and used, a road billing system is likely to erroneously recognize the ordinary vehicle as the motorcycle and charge a fee for a motorcycle at a time of billing on a toll road.

Therefore, it is desirable to be able to detect that the on-board unit which stores information about a vehicle is used in another vehicle.

Several technologies for detecting fraud related to an on-board unit have been proposed. For example, a monitoring device for a fraudulent passing vehicle described in Patent Literature 1 includes a base station antenna for mobile communication, a camera that performs image capturing of a passing vehicle, an image processing device that identifies a number plate and vehicle type information of the vehicle from the image captured by the camera, and an antenna processing device that detects the fraudulent passing vehicle from a mismatch between vehicle data obtained by communicating with the vehicle via the base station antenna and the number plate and the vehicle type information of the vehicle identified by the image processing device.

In Patent Literature 1, in the monitoring device for a fraudulent passing vehicle, a vehicle using a toll road is prevented from using the toll road fraudulently by reloading an on-board unit.

CITATION LIST

Patent Literature

[Patent Literature 1] Japanese Unexamined Patent Application, First Publication No. 2009-116480

SUMMARY OF INVENTION

Technical Problem

Fraud regarding an on-board unit is required to be able to be detected using a simple scheme.

The present invention provides an on-board unit and a fault determination method capable of easily detecting that an on-board unit storing information about vehicle is used for another vehicle.

Solution to Problem

According to a first aspect of the present invention, an on-board unit (100, 200, 300, or 400) is an on-board unit that is attached to a vehicle, stores information about the vehicle, and performs a process using the information about the vehicle, and includes: a state information acquisition unit (141, 241, 341, or 441) that acquires state information indicating a state of the on-board unit; a storage unit management unit (142) that stores the state information in a storage unit (130) when the on-board unit is powered off; and a fault determination unit (143, 243, 343, or 443) that determines whether or not state information acquired when the on-board unit is powered on matches the state information stored in the storage unit, and determines a fault when the fault determination unit determines that the state information acquired when the on-board unit is powered on does not match the state information stored in the storage unit.

Thus, the on-board unit detects that the on-board unit has been transferred to another vehicle on the basis of the state information. Accordingly, it is possible to easily detect that the on-board unit is used for the other vehicle.

The on-board unit may include an acceleration sensor, and the state information acquisition unit may acquire information indicating an angle between a vertical direction and a reference direction set in the on-board unit as the state information on the basis of an acceleration detected by the acceleration sensor.

Thus, the on-board unit detects that the on-board unit has been transferred to another vehicle on the basis of the acceleration detected by the acceleration sensor. Accordingly, it is possible to easily detect that the on-board unit is used for the other vehicle.

The state information acquisition unit may acquire position information of the on-board unit in a horizontal direction as the state information.

Thus, the on-board unit detects that the on-board unit has been transferred to another vehicle on the basis of the position information of the on-board unit in the horizontal direction. Accordingly, it is possible to easily detect that the on-board unit is used for the other vehicle.

The state information acquisition unit may acquire information indicating a height of a position of the on-board unit as the state information.

Thus, the on-board unit detects that the on-board unit has been transferred to another vehicle on the basis of the information indicating the height of the position of the on-board unit. Accordingly, it is possible to easily detect that the on-board unit is used for the other vehicle.

The state information acquisition unit may acquire information indicating a voltage supplied from a power supply to the on-board unit as the state information.

Thus, it is possible to provide the on-board unit with a relatively simple configuration including a device or a circuit capable of measuring a voltage.

The on-board unit may include an acceleration sensor, and the state information acquisition unit may acquire information indicating vibration detected by the acceleration sensor as the state information.

Accordingly, it is possible to detect reloading of the on-board unit from a gasoline vehicle to an electric vehicle or reloading of the on-board unit from an electric vehicle to a gasoline vehicle.

The on-board unit may be attached to a windshield of the vehicle.

In many cases, the inclination of a windshield is different depending on vehicle models such as the inclination of the windshield of a large vehicle being steeper than that of an ordinary vehicle. Thus, the on-board unit is attached to a windshield, thereby increasing accuracy with which reloading into another vehicle can be detected.

According to a second aspect of the present invention, a fault determination method is a fault determination method for an on-board unit that is attached to a vehicle, stores information about the vehicle, and performs a process using the information about the vehicle, the fault determination method including: a writing step of storing state information indicating a state of the on-board unit in a storage unit when the on-board unit s powered off; and a fault determination step of determining whether or not state information acquired when the on-board unit is powered on matches the state information stored in the storage unit, and determining a fault when it is determined that the state information acquired when the on-board unit is powered on does not match the state information stored in the storage unit.

Thus, in the fault determination method, transferring the on-board unit itself into another vehicle is detected on the basis of the state information. Accordingly, it is possible to easily detect use of the on-board unit in another vehicle.

Advantageous Effects of Invention

According to the on-board unit and the fault determination method described above, it is possible to easily detect that an on-board unit that stores information about a vehicle is used for another vehicle.

EMBODIMENTS FOR CARRYING OUT THE INVENTION

Hereinafter, embodiments of the present invention will be described, but the following embodiments do not limit the invention according to the claims. Further, all combinations of characteristics described in the embodiments are not essential to a solution of the invention.

First Embodiment

Figure 1:
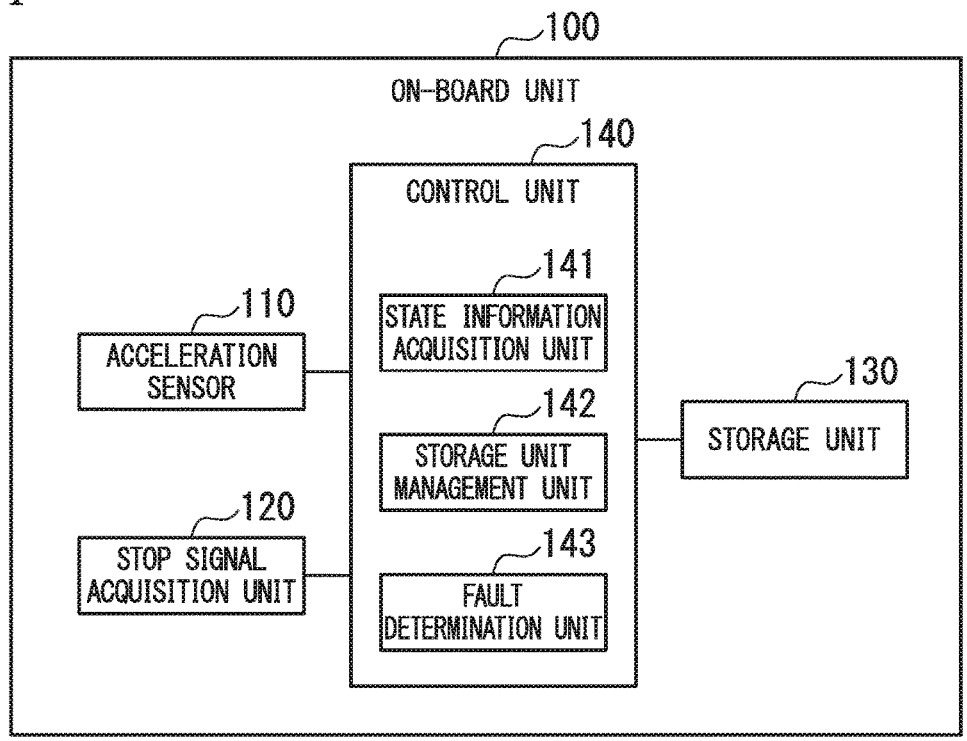
FIG. 1 is a schematic block diagram illustrating a functional configuration of an on-board unit according to a first embodiment of the present invention.

FIG. 1 is a schematic block diagram illustrating a functional configuration of an on-board unit in a first embodiment of the present invention. In FIG. 1, an on-board unit 100 includes an acceleration sensor 110, a stop signal acquisition unit 120, a storage unit 130, and a control unit 140. The control unit 140 includes a state information acquisition unit 141, a storage unit management unit 142, and a fault determination unit 143.

The on-board unit 100 is an on-board unit that stores information about a vehicle to which the on-board unit 100 is attached and performs a process using the information. An example of the on-board unit 100 can include an on-board unit that stores information about the vehicle to which the on-board unit 100 is attached and performs a billing process for a toil road on the basis of the information, but is not limited thereto.

Further, the vehicle to which the on-board unit is attached is referred to as a "on-board unit installed vehicle."

The acceleration sensor 110 detects its own acceleration as acceleration in the on-board unit 100. In a state in which the on-board unit installed vehicle stops (a state in which the on-board unit installed vehicle does not travel), the acceleration sensor 110 detects gravitational acceleration. The gravitational acceleration detected by the acceleration sensor 110 is used as information indicating a posture of the on-board unit 100. The posture of the on-board unit 100 described herein is a degree of inclination of the on-board unit 100.

Information indicating the posture is indicated as "posture information".

Further, in a scheme in which the on-board unit acquires Global Navigation Satellite System (GNSS) information and performs a billing process according to a position (an autonomous billing system), the on-board unit often includes an acceleration sensor so as to correct the GNSS information. When the on-hoard unit 100 includes an acceleration sensor for a predetermined use such as correction of GNSS information, the acceleration sensor can be used as the acceleration sensor 110, and it is not necessary for the acceleration sensor to be separately included for a determination of whether reloading of the on-board unit 100 has been performed.

Figure 2:
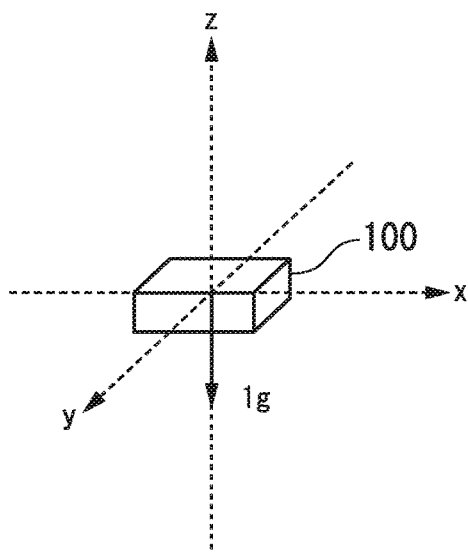
FIG. 2 is an illustrative diagram illustrating an example of a reference posture of the on-board unit in the embodiment.

FIG. 2 is an illustrative diagram illustrating an example of a reference posture of the on-board unit 100. Hereinafter, an outer shape of the on-board unit 100 will be described as a rectangular parallelepiped, but the outer shape of the on-board unit 100 is not limited thereto.

FIG. 2 illustrates an example of a case in which the acceleration sensor 110 is a tri-axial acceleration sensor, and the acceleration sensor 110 detects acceleration in each of directions of an x-axis, a y-axis, and a z-axis illustrated in FIG. 2. The x-axis and the y-axis are each set as a long side direction and a short side direction of a bottom surface of the on-board unit 100. Further, the z-axis is set as a height direction of the on-board unit 100.

In a reference posture illustrated in FIG. 2, the bottom surface of the on-board unit 100 is in a horizontal direction. In the reference posture, the acceleration sensor 110 detects an acceleration of −g (g denotes the gravitational acceleration) in the z-axis direction. The acceleration is negative since an upward direction of the z-axis is positive.

Figure 3:
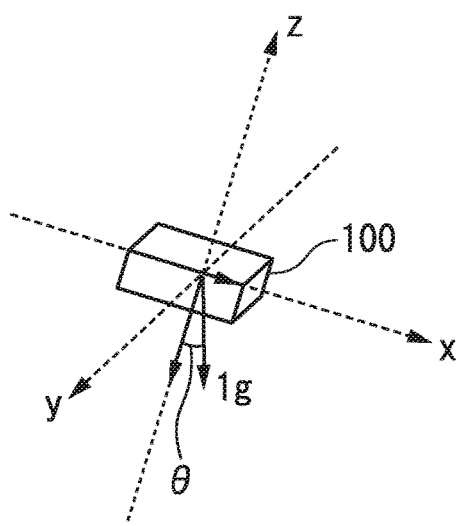
FIG. 3 is an illustrative diagram illustrating an example of a gravitational acceleration detected by an acceleration sensor in a state in which the on-board unit is inclined with respect to the reference posture in the embodiment.

FIG. 3 is an illustrative diagram illustrating an example of a gravitational acceleration that is detected by the acceleration sensor 110 in a state in which the on-board unit 100 is inclined with respect to the reference posture.

FIG. 3 is an example of a state in which the on-board unit 100 is rotated by an angle θ about the y-axis from the reference posture. In this case, in a state in which the on-board unit installed vehicle stops, the acceleration sensor 110 detects an acceleration of g sin θ in the x-axis direction and g cos θ in the z-axis direction. Thus, if a posture of the on-board unit 100 is changed, the acceleration detected by the acceleration sensor 110 is changed. Therefore, it is possible to determine whether the postures of the on-board unit 100 are the same by determining whether the accelerations detected by the acceleration sensor 110 in a state in which the on-board unit installed vehicle stops match.

The stop signal acquisition unit 120 functions as an interface between the on-board unit 100 and the on-board unit installed vehicle and transfers various signals. In particular, the stop signal acquisition unit 120 acquires a signal indicating that the on-board unit 100 is powered off. The signal indicating that the on-board unit 100 is powered off is referred to as a "power off signal".

For example, if an operation is performed to turn off an electrical system of the on-board unit installed vehicle, the on-board unit installed vehicle outputs the power off signal to the on-board unit 100 to stop a supply of power to the on-board unit 100 after a certain period of time has elapsed. The stop signal acquisition unit 120 acquires the power off signal and outputs the power off signal to the control unit 140.

The operation to turn off the electrical system of the on-board unit installed vehicle is performed, for example, as an operation in which a driver of the on-board unit installed vehicle turns off an ignition switch.

The storage unit 130 is configured using a storage device included in the on-board unit 100 and stores various types of information. In particular, the storage unit 130 stores information about the vehicle to which the on-board unit 100 is attached or state information indicating a state of the on-board unit 100. In this embodiment, posture information about the on-board unit 100 is used as the state information, but the present invention is not limited thereto. For example, in an embodiment described below, position information of the on-board unit 100 or information indicating a voltage supplied from a power supply to the on-board unit 100 is used as the state information.

The control unit 140 controls each unit of the on-board unit 100 to execute various functions. The control unit 140 is realized, for example, by a central processing unit (CPU) included in the on-board unit 100 reading a program from the storage unit 130 and executing the program.

The state information acquisition unit 141 acquires the state information. In particular, the state information acquisition unit 141 acquires the state information if the stop signal acquisition unit 120 acquires the power off signal and stores the state information in the storage unit 130 via the storage unit management unit 142. Further, the state information acquisition unit 141 acquires the state information if the on-board unit 100 is powered on from a powered off state (that is, is resupplied with power) and starts up and outputs the state information to the fault determination unit 143.

In this embodiment, the state information acquisition unit 141 acquires the posture information about the on-board unit 100 as the state information. For example, the state information acquisition unit 141 calculates an angle of inclination of the on-board unit 100 from the information indicating the acceleration detected by the acceleration sensor 110 and uses the angle as the state information. Further, for example, the state information acquisition unit 141 calculates an angle of inclination in the height direction of the on-board unit 100 with respect to a vertical direction and uses the angle as the state information. The height direction of the on-board unit 100 here is an example of a reference direction set in the on-board unit 100, but the present invention is not limited thereto. Further, the angle of inclination in the height direction (a z-direction) of the on-board unit 100 with respect to the vertical direction (a direction 1g) is illustrated as being an angle θ in FIG. 3.

Alternatively, the state information acquisition unit 141 may use a three-dimensional vector indicating the acceleration detected by the acceleration sensor 110 as the state information. In this case, the three-dimensional vector indicating the acceleration detected by the acceleration sensor 110 indicates a deviation between the reference direction set in the on-board unit and the vertical direction, and corresponds to information indicating an angle between the reference direction set in the on-board unit and the vertical direction.

The storage unit management unit 142 performs writing of information to the storage unit 130 or reading of information from the storage unit 130. In particular, the storage unit management unit 142 stores (writes) the state information acquired by the state information acquisition unit 141 when the stop signal acquisition unit 120 acquires the power off signal in the storage unit 130. If the on-board unit 100 is resupplied with power from the powered off state and starts up, the storage unit management unit 142 reads the state information from the storage unit 130 and outputs the state information to the fault determination unit 143.

The fault determination unit 143 determines whether or not there is a fault on the basis of the state information acquired by the state information acquisition unit 141. The fault herein indicates that the on-board unit 100 has been transferred to another vehicle. More specifically, the fault determination unit 143 determines whether or not the state information acquired by the state information acquisition unit 141 when the stop signal acquisition unit 120 acquires the power off signal matches the state information acquired by the state information acquisition unit 141 when the on-board unit 100 started up.

For example, when the state information acquisition unit 141 calculates the angle of inclination of the on-board unit 100 as the state information, the fault determination unit 143 determines whether or not a magnitude of a change in the angle is larger than a predetermined threshold value, and determines that there is a fault if the fault determination unit 143 determines that the magnitude is larger than the threshold value.

Alternatively, when the state information acquisition unit 141 acquires the three-dimensional vector indicating the acceleration detected by the acceleration sensor 110 as the state information, the fault determination unit 143 determines whether or not there is a fault on the basis of a magnitude of a change in each component of the three-dimensional vector. For example, the state information acquisition unit 141 determines whether or not a sum of the magnitude of the change in each of the components is larger than a predetermined threshold value, and determines that there is a fault when the state information acquisition unit 141 determines that the sum is larger than the threshold value. Alternatively, the state information acquisition unit 141 may determine whether or not there is a magnitude of a change larger than the predetermined threshold value among magnitudes of changes in respective components of the three-dimensional vector.

Figure 4:
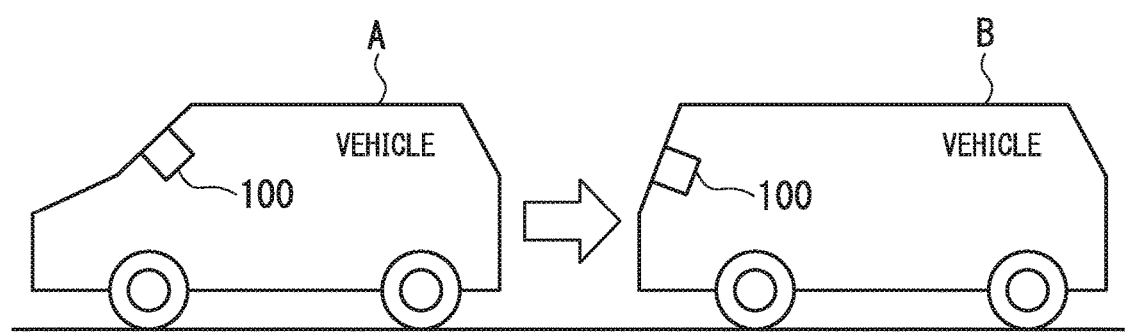
FIG. 4 is an illustrative diagram illustrating an example of a change in a posture of an on-board unit when the on-board unit is transferred to another vehicle in the embodiment.

FIG. 4 is an illustrative diagram illustrating an example of a change in a posture of the on-board unit 100 when the on-board unit 100 is transferred to another vehicle. In FIG. 4, a schematic shape of a wagon type vehicle A and a schematic shape of a one-box type vehicle B are illustrated. The vehicle A is a vehicle to which the on-board unit 100 is attached before reloading, and the storage unit 130 stores information about the vehicle A. The vehicle B is a vehicle into which the on-board unit 100 has been transferred.

In the example of FIG. 4, the on-board unit 100 is attached to a windshield of the vehicle. Since an inclination of the windshield is different between the vehicle A and the vehicle B, a posture of the on-board unit 100 is different. Thus, the acceleration sensor 110 detects a gravitational acceleration that is different before reloading and after reloading. The fault determination unit 143 detects a change in the posture of the on-board unit 100 on the basis of the gravitational acceleration and detects that the on-board unit 100 has been transferred to another vehicle.

Alternatively, the fault determination unit 143 may detect that reloading of the on-board unit 100 has been performed on the basis of a vibration detected by the acceleration sensor 110 in a state in which the on-board unit installed vehicle does not travel in addition to or in place of the posture of the on-board unit 100 detected by the acceleration sensor 110. For example, a gasoline vehicle vibrates at a time of idling, whereas an electric vehicle does not vibrate. Therefore, if the fault determination unit 143 detects a change in vibration, reloading of the on-board unit 100 from the gasoline vehicle to the electric vehicle or reloading of the on-board unit 100 from the electric vehicle to the gasoline vehicle can be detected.

For example, the fault determination unit 143 determines whether or not a difference between an acceleration detection value acquired from the acceleration sensor 110 when the stop signal acquisition unit 120 acquires the power off signal and an acceleration detection value acquired from the acceleration sensor 110 when the on-board unit 100 starts up is smaller than or equal to a predetermined threshold value. As information about a vibration detected by the acceleration sensor 110, a vibration frequency, a magnitude of the vibration, or a combination thereof can be used.

Next, an operation of the on-board unit 100 will be described with reference to FIGS. 5 and 6.

Figure 5:
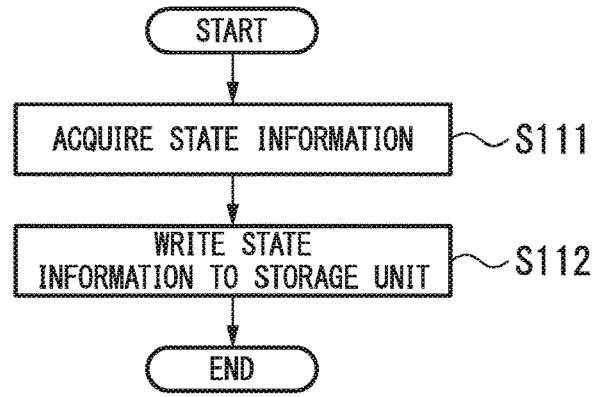
FIG. 5 is a flowchart illustrating a procedure of a process performed by the on-board unit when a supply of power to the on-board unit stops in the embodiment.

FIG. 5 is a flowchart illustrating a procedure of a process performed by the on-board unit 100 when a supply of power to the on-board unit 100 stops. The on-board unit 100 starts the process of FIG. 5 if the stop signal acquisition unit 120 acquires the power off signal.

In the process of FIG. 5, the state information acquisition unit 141 acquires state information (step S111). In this embodiment, the state information acquisition unit 141 calculates the angle of inclination of the on-board unit 100 on the basis of an acceleration detected by the acceleration sensor 110.

Next, the storage unit management unit 142 stores the state information acquired by the state information acquisition unit 141 in step S111 in the storage unit 130 (step S112). In this embodiment, the storage unit management unit 142 stores angle information indicating the inclination of the on-board unit 100 in the storage unit 130.

In a case in which the storage unit 130 has already stored the state information, the storage unit management unit 142 overwrites the state information. That is, the storage unit 130 may store only last written state information and does not have to store a history of state information.

After step S112, the process of FIG. 5 ends.

Figure 6:
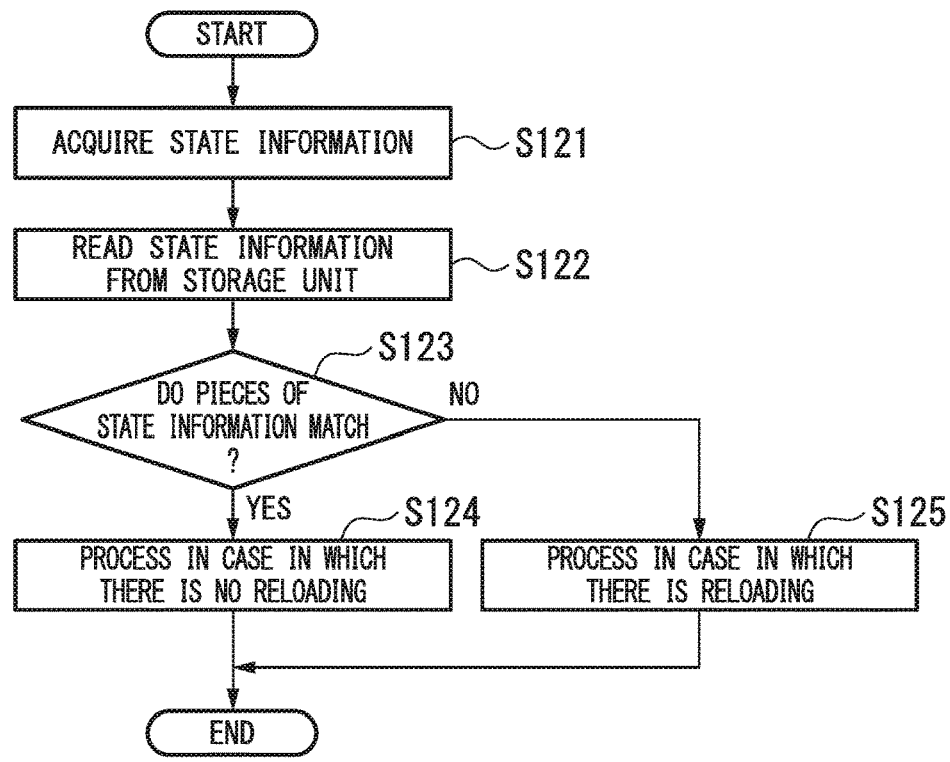
FIG. 6 is a flowchart illustrating a procedure of a process performed by the on-board unit when a supply of power to the on-board unit is resumed in the embodiment.

FIG. 6 is a flowchart illustrating a procedure of a process performed by the on-board unit 100 when a supply of power to the on-board unit 100 is resumed. When the on-board unit 100 is supplied with power from the powered off state and starts up, the on-board unit 100 starts the process of FIG. 6.

In the process of FIG. 6, step S121 is the same as step S111 (FIG. 5).

Further, the storage unit management unit 142 reads the state information from the storage unit 130 (step S122). In this embodiment, the storage unit management unit 142 reads angle information indicating the inclination of the on-board unit 100 from the storage unit 130.

An order of execution of steps S121 and S122 is arbitrary. Step S122 may be executed before step S121 or step S121 and step S122 may be executed in parallel.

Next, the fault determination unit 143 determines whether or not the state information obtained in step S121 matches the state information obtained in step S122 (step S123). In this embodiment, the fault determination unit 143 calculates a difference between the angle obtained in step S121 and the angle in step S122, and determines whether or not the obtained difference is smaller than or equal to a predetermined threshold value. If the difference is determined to be smaller than or equal to the threshold value, the fault determination unit 143 determines that the pieces of state information match. On the other hand, if the difference is determined to larger than the threshold value, the fault determination unit 143 determines that the pieces of state information do not match.

If it is determined that the pieces of state information match (step S123: YES), the on-board unit 100 performs a process in a case in which there is no reloading (step S124). For example, the on-board unit 100 starts to operate in a normal state.

After step S124, the process of FIG. 6 ends.

On the other hand, if it is determined that the pieces of state information do not match (step S123: NO), the on-board unit 100 performs a process in a case in which there is reloading (step S125). The process in the case in which there is reloading can include various processes. For example, the on-board unit 100 may communicate with a billing server device and notify that reloading has been detected. Alternatively when the on-board unit installed vehicle passes through a roadside device installed place, the on-board unit 100 may communicate with a roadside device and request the roadside device to image the on-board unit installed vehicle.

In order to reduce an erroneous determination in which reloading of the on-board unit 100 is determined to have been performed despite reloading not having been performed, the on-board unit 100 may perform the process in the case in which there is reloading in step S125 if the fault determination unit 143 detects a mismatch of the angles in step S123 a plurality of times.

After step S125, the process of FIG. 6 ends.

As described above, the storage unit management unit 142 stores the state information in the storage unit 130 when the on-board unit 100 is powered off. The fault determination unit 143 determines whether or not the state information acquired when the on-board unit 100 is powered on matches the state information stored in the storage unit 130, and determines that there is a fault if the state information acquired when the on-board unit 100 is powered on does not match the state information stored the storage unit 130.

Thus, the on-board unit 100 detects that the on-board unit 100 has been transferred to another vehicle (a vehicle other than the vehicle that the on-board unit 100 has stored information about) on the basis of the state information. Accordingly, it is possible to easily detect that the on-board unit 100 is used in another vehicle.

In particular, the fault determination unit 143 compares the state information acquired when the on-board unit 100 is powered off with the state information acquired when the on-board unit 100 is powered on. Accordingly, the fault determination unit 143 detects that reloading of the on-board unit 100 was performed while the on-board unit 100 was powered off. Here, it is conceivable for the reloading of the on-board unit 100 to usually be performed after the on-board unit 100 is powered off. In this regard, according to the on-board unit 100, the reloading of the on-board unit 100 is less likely to be erroneously detected.

Here, a method of monitoring a fraudulent passing vehicle includes a method in which a monitoring device includes a camera to image a vehicle and determines whether there is fraud on the basis of the obtained image. However, in this method, a manufacturing cost or an operation cost is high because the monitoring device needs to include the camera. Further, in this method, fraud cannot be detected for vehicles that travel at a place at which no camera is installed. On the other hand, according to the on-board unit 100, it is possible to detect fraud without requiring a camera. In this regard, according to the on-board unit 100, it is possible to realize a relatively low manufacturing cost or operation cost and to detect fraud at a place in which no camera is installed.

Further, the state information acquisition unit 141 acquires information indicating an angle between a vertical direction and the reference direction set in the on-board unit 100 as the state information on the basis of the acceleration detected by the acceleration sensor 110. The fault determination unit 143 determines whether or not angles of inclination of the on-board unit 100 between when the on-board unit 100 is powered off and when the on-board unit 100 is powered on matches to determine whether or not the reloading of the on-board unit 100 has been performed.

If the on-board unit 100 includes an acceleration sensor for predetermined use such as correction of GNSS information, the acceleration sensor can be used as the acceleration sensor 110, and it is not necessary to separately include an acceleration sensor for a determination of whether the on-board unit 100 has been transferred. In this regard, it is possible to simplify a configuration of the on-board unit 100 and to reduce a size or a manufacturing cost of the on-board unit 100.

Further, a powering-on and off of the on-board unit is generally interlocked with a powering-on and off of an electrical system of a vehicle to which the on-board unit is attached, and the vehicle is expected not to travel while the on-board unit is powered off. Accordingly, the inclination of the on-board unit 100 is expected not to change while the on-board unit 100 is powered off as long as the on-board unit 100 remains attached to the vehicle. In this regard, according to the on-board unit 100, a possibility that reloading of the on-board unit 100 is erroneously detected as having been performed despite the reloading not having been performed is low.

Here, as a method in which the on-board unit detects a transfer of the on-board unit itself, a method of storing a reference value of an inclination of the on-board unit itself in a state in which the on-board unit is attached to a vehicle, and determining whether or not the reference value matches a measurement value of the inclination is conceivable. However, in this method, in a case where the inclination of the on-board unit is changed for reasons other than reloading the on-board unit, such as a case in which the vehicle stops on an inclined load, the reloading of the on-board unit 100 is erroneously detected as having been performed despite the reloading not having been performed.

On the other hand, in the on-board unit 100, a possibility that reloading of the on-board unit 100 is erroneously detected as having been performed despite the reloading not having been performed is low, as described above.

Second Embodiment

Figure 7:
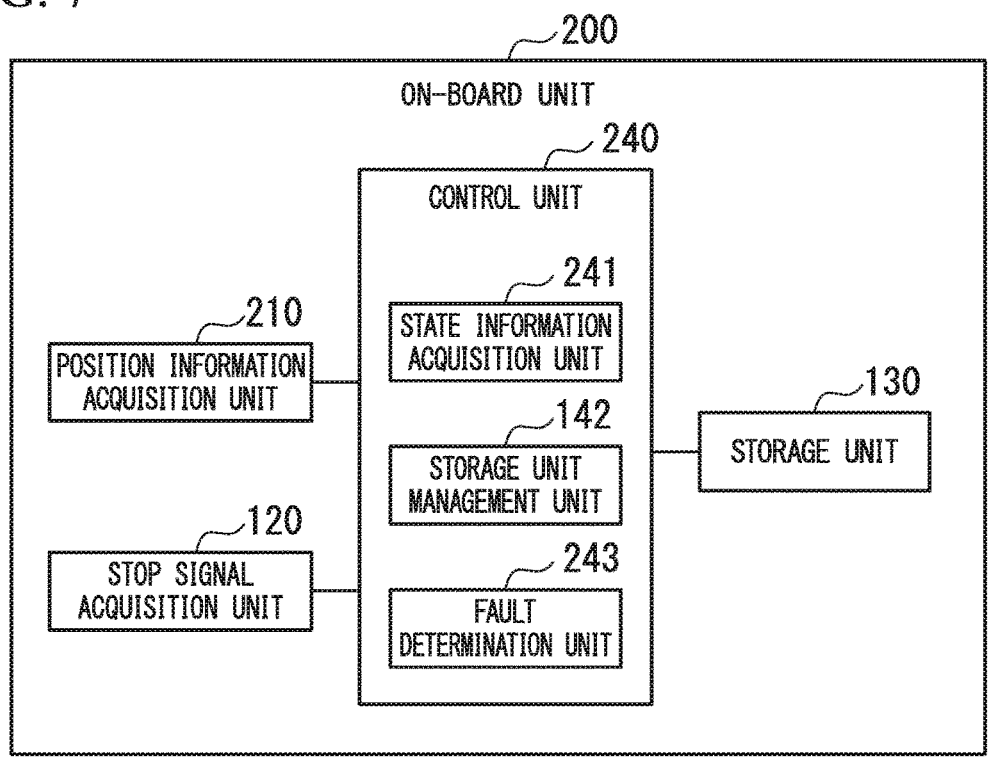
FIG. 7 is a schematic block diagram illustrating a functional configuration of an on-board unit according to a second embodiment of the present invention.

FIG. 7 is a schematic block diagram illustrating a functional configuration of an on-board unit according to a second embodiment of the present invention. In FIG. 7, an on-board unit 200 includes a position information acquisition unit 210, a stop signal acquisition unit 120, a storage unit 130, and a control unit 240. The control unit 240 includes a state information acquisition unit 241, a storage unit management unit 142, and a fault determination unit 243. In FIG. 7, units having the same functions as those in FIG. 1 are denoted with the same reference numerals (120, 130, and 142) and description thereof will be omitted.

The on-board unit 200, similar to the on-board unit 100 (FIG. 1), is an on-board unit that stores information about vehicle to which the on-board unit 200 is attached and performs a process using the information. On the other hand, the on-board unit 200 differs from the on-board unit 100 in that whether the on-board unit 200 has been transferred is determined on the basis of a position of the vehicle to which the on-board unit 200 is attached. Further, information indicating the position is referred to as "position information".

The position information acquisition unit 210 acquires position information of an on-board unit installed vehicle. For example, the position information acquisition unit 210 functions as a GNSS receiver and calculates position information of the on-board unit 200 as the position information of the on-board unit installed vehicle. Alternatively, the position information acquisition unit 210 may function as an interface with a GNSS receiver installed outside the on-board unit 200 and acquire position information calculated by the GNSS receiver.

In an autonomous billing scheme, the on-board unit generally has a GNSS function for a billing process or acquires position information from the GNSS receiver. When the on-board unit 200 acquires position information for a predetermined use such as a billing process, the position information can be used for a determination of whether or not the on-board unit 200 has been transferred. Therefore, it is not necessary for the on-board unit 200 to separately include a GNSS receiver for a determination of whether or not the on-board unit 200 has been transferred.

The state information acquisition unit 241, similar to the state information acquisition unit 141 (FIG. 1), acquires state information. In particular, the state information acquisition unit 241 acquires the state information if the stop signal acquisition unit 120 acquires a power off signal and stores the state information in the storage unit 130 via the storage unit management unit 142. Further, the state information acquisition unit 241 acquires the state information if the on-board unit 200 is supplied with power again from a powered off state and starts up, and outputs the state information to the fault determination unit 243. On the other hand, the state information acquisition unit 241 differs from the state information acquisition unit 141 in that the state information acquisition unit 241 acquires position information of the on-board unit installed vehicle as the state information.

The fault determination unit 243 determines whether or not there is a fault on the basis of the state information acquired by the state information acquisition unit 241. The fault determination unit 243, similar to the fault determination unit 143, determines whether or not the state information acquired when the stop signal acquisition unit 120 acquires the power off signal matches state information acquired when the on-board unit 200 starts up. On the other hand, the fault determination unit 243 is different from the fault determination unit 143 in that the position information of the on-board unit installed vehicle is used as the state information.

Figure 8:
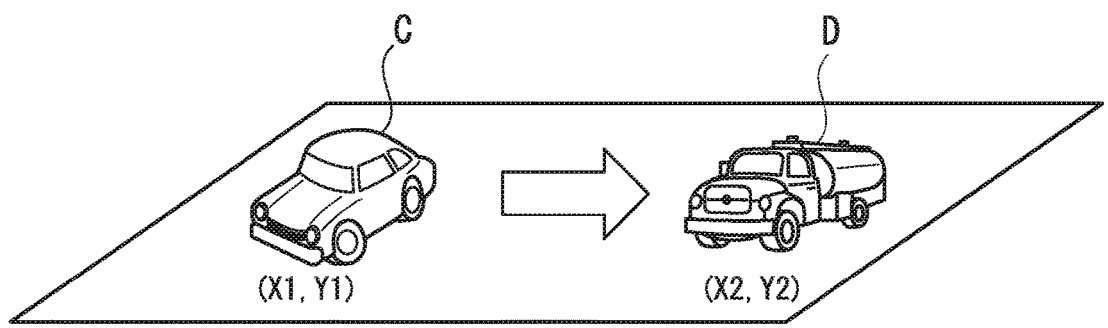
FIG. 8 is an illustrative diagram illustrating an example of a change in a position of an on-board unit installed vehicle when the on-board unit is transferred to another vehicle in the embodiment.

FIG. 8 is an illustrative diagram illustrating an example of a change in a position of the on-board unit installed vehicle when the on-board unit 200 is transferred to another vehicle. In FIG. 8, a vehicle C is a vehicle to which the on-board unit 200 is attached before reloading, and the storage unit 130 stores information about the vehicle C. A vehicle D is a vehicle into which the on-board unit 200 has been transferred.

A position of the on-board unit installed vehicle is changed due to the on-board unit 200 being transferred. In the example of FIG. 8, a horizontal position of the on-board unit installed vehicle (for example, latitude and longitude) is (X1, Y1) before reloading the on-board unit 200, whereas the horizontal position is (X2, Y2) after reloading.

The fault determination unit 243 detects that reloading of the on-board unit 200 has been performed by detecting a change in the position of the on-board unit installed vehicle. For example, the fault determination unit 243 determines whether or not a horizontal position of the on-board unit installed vehicle acquired when the stop signal acquisition unit 120 acquires the power off signal matches a horizontal position of the on-board unit installed vehicle acquired when the on-board unit 200 starts up.

Alternatively, the fault determination unit 243 may detect that reloading of the on-board unit 200 has been performed on the basis of position information in the vertical direction in addition to or in place of position information in the horizontal direction. For example, the position information acquisition unit 210 functions as a GNSS receiver and calculates a height from a ground thereof on the basis of a signal from a GNSS satellite. It is conceivable that this height indicates a height from the ground of the on-board unit 200 or a GNSS antenna. The fault determination unit 243 determines whether reloading of the on-board unit 200 has been performed on the basis of a change in the height calculated by the position information acquisition unit 210.

For example, if the on-board unit 200 is transferred from an ordinary vehicle to a large vehicle such as a truck, it is conceivable that a height from the ground of a position at which the on-board unit 200 is attached is different. Accordingly, the fault determination unit 243 can detect a change in the height to detect that reloading of the on-board unit 200 has been performed. For example, the fault determination unit 243 determines whether or not a difference between a height of the on-board unit 200 acquired when the stop signal acquisition unit 120 acquires the power off signal and a height of the on-board unit 200 acquired when the on-board unit 200 starts up is smaller than or equal to a predetermined threshold value.

Then, an operation of the on-board unit 200 will be described.

When the supply of power to the on-board unit 200 stops, the on-board unit 200 performs the process illustrated in FIG. 5.

In step S111, the state information acquisition unit 241 acquires, as state information, position information calculated by a GNSS receiver via the position information acquisition unit 210.

In step S112, the storage unit management unit 142 stores the position information acquired by the state information acquisition unit 241 in step S111 in the storage unit 130.

When the supply of power to the on-board unit 200 is resumed, the on-board unit 200 performs the process illustrated in FIG. 6.

In step S122, the storage unit management unit 142 reads the position information.

In step S123, the fault determination unit 243 calculates the distance between the position obtained in step S121 and the position obtained in step S122 to determine whether or not the obtained distance is smaller than or equal to a predetermined threshold value. If the fault determination unit 243 determines that the distance is smaller than or equal to the threshold value, the fault determination unit 243 determines that the pieces of state information match. On the other hand, if the fault determination unit 243 determines that the distance is larger than the threshold value, the fault determination unit 243 determines that the pieces of state information do not match.

As described above, the state information acquisition unit 241 acquires position information of the on-board unit in the horizontal direction as the state information. The fault determination unit 243 determines whether the positions indicated by the pieces of position information match between when the on-board unit 200 is powered off and the on-board unit 200 is powered on to determine whether or not reloading of the on-board unit 200 has been performed.

When the on-board unit 200 acquires the position information for a predetermined use such as a billing process, the position information can be used for a determination of whether or not the on-board unit 200 has been transferred. Therefore, it is not necessary for the on-board unit 200 to separately include a GNSS receiver for the determination of whether or not the on-board unit 200 has been transferred. In this regard, it is possible to simplify the configuration of the on-board unit 200 and to reduce a size or a manufacturing cost of the on-board unit 200.

Further, the state information acquisition unit acquires information indicating a height of the position of on-board unit 200 as the state information. The fault determination unit 243 determines whether heights match between when the on-board unit 200 is powered off and the on-board unit 200 is powered on to determine whether or not reloading of the on-board unit 200 has been performed.

When the on-board unit 200 acquires the position information for a predetermined use such as a billing process, the position information can be used for a determination of whether or not the on-board unit 200 has been transferred. Therefore, it is not necessary for the on-board unit 200 to separately include a GNSS receiver for the determination of whether or not the on-hoard unit 200 has been transferred. In this regard, it is possible to simplify the configuration of the on-board unit 200 and to reduce the size or a manufacturing cost of the on-board unit 200.

Third Embodiment

Figure 9:
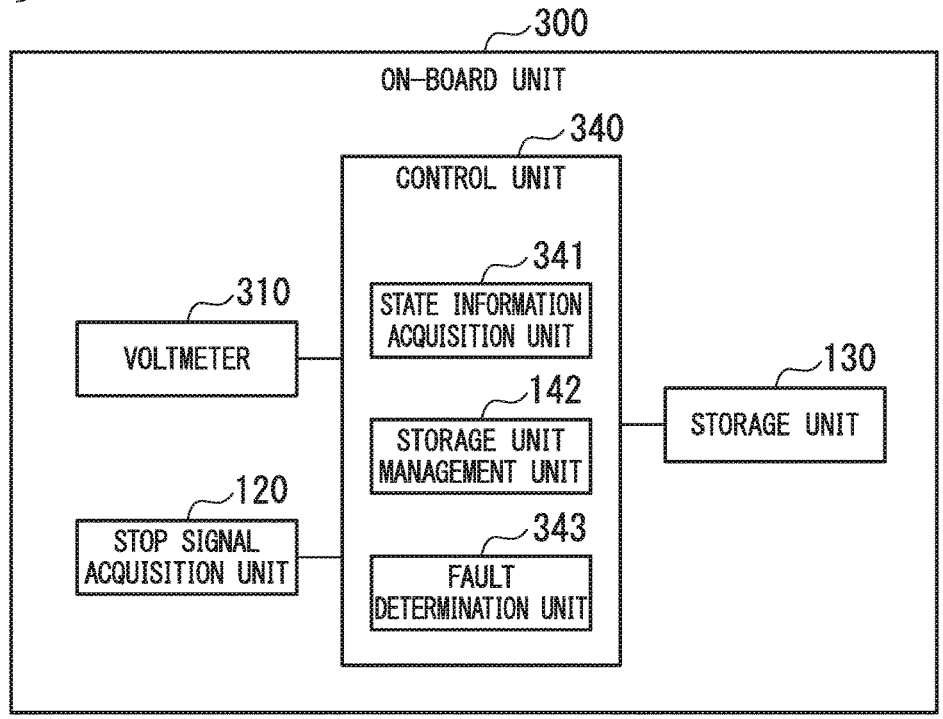
FIG. 9 is a schematic block diagram illustrating a functional configuration of an on-board unit according to a third embodiment of the present invention.

FIG. 9 is a schematic block diagram illustrating a functional configuration of an on-board unit in a third embodiment of the present invention. In FIG. 9, an on-board unit 300 includes a voltmeter 310, a stop signal acquisition unit 120, a storage unit 130, and a control unit 340. The control unit 340 includes a state information acquisition unit 341, a storage unit management unit 142, and a fault determination unit 343. In FIG. 9, portions having the same functions as respective units in FIG. 1 are denoted with the same reference numerals (120, 130, and 142), and description thereof will be omitted.

The on-board unit 300, similar to the on-board unit 100 (FIG. 1), is an on-board unit that stores information about a vehicle to which the on-board unit 300 is attached and performs a process using the information.

On the other hand, the on-board unit 300 differs from the on-board unit 100 in that whether the on-board unit 300 has been transferred is determined on the basis of a voltage supplied from a power supply (a power supply outside the on-board unit 300) to the on-board unit 300.

The voltmeter 310 measures the voltage supplied from the power supply to the on-board unit 300. For example, the voltmeter 310 measures a voltage at a power reception terminal via which the on-board unit 300 receives a supply of power from the outside.

The state information acquisition unit 341, similar to the state information acquisition unit 141 (FIG. 1), acquires state information. In particular, the state information acquisition unit 341 acquires the state information if the stop signal acquisition unit 120 acquires a power off signal and stores the state information in the storage unit 130 via the storage unit management unit 142. Further, the state information acquisition unit 341 acquires the state information if the on-board unit 300 is supplied with power again from a powered off state and starts up, and outputs the state information to the fault determination unit 343. On the other hand, the state information acquisition unit 341 differs from the state information acquisition unit 141 in that the state information acquisition unit 341 acquires voltage information indicating the voltage supplied from the power supply to the on-board unit 300 as the state information.

The fault determination unit 343 determines whether or not there is a fault on the basis of the state information acquired by the state information acquisition unit 341. The fault determination unit 343, similar to the fault determination unit 143, determines whether or not the state information acquired when the stop signal acquisition unit 120 acquires the power off signal matches state information acquired when the on-board unit 300 starts up. On the other hand, the fault determination unit 343 is different from the fault determination unit 143 in that the voltage information indicating the voltage supplied from the power supply to the on-board unit 300 is used as the state information.

Here, a power supply voltage may be different depending on vehicle models. For example, a motorcycle uses a voltage of 6 volts (V) or 12 volts, and an ordinary vehicle uses a voltage of 12 volts or 24 volts. Accordingly, the fault determination unit 343 can detect that reloading of the on-board unit 300 has been performed by detecting a change in the voltage supplied from the power supply to the on-board unit 300. Specifically, the fault determination unit 343 determines whether or not a voltage value of the voltage supplied from the power supply to the onboard unit 300 when the stop signal acquisition unit 120 acquires the power off signal matches a voltage value of a voltage supplied from the power supply to the on-board unit 300 when the on-board unit 200 starts up.

Next, an operation of the on-board unit 300 will be described.

When the supply of power to the on-board unit 300 stops, the on-board unit 300 performs the process illustrated in FIG. 5.

The state information acquisition unit 341 in step S111 acquires voltage information indicating the voltage supplied from the power supply to the on-board unit 300, which is measured by the voltmeter 310, as state information.

In step S112, the storage unit management unit 142 stores the voltage information acquired by the state information acquisition unit 341 in step S111 in the storage unit 130.

When the supply of power to the on-board unit 300 is resumed, the on-board unit 300 performs the process illustrated in FIG. 6.

In step S122, the storage unit management unit 142 reads the voltage information.

In step S123, the fault determination unit 343 calculates a difference between the voltage value obtained in step S121 and the voltage value obtained in step S122 and determines whether or not the obtained difference is smaller than or equal to a predetermined threshold value. If the fault determination unit 343 determines that the difference is smaller than or equal to the threshold value, the fault determination unit 343 determines that the pieces of state information match. On the other hand, if the fault determination unit 343 determines that the difference is larger than the threshold value, the fault determination unit 343 determines that the pieces of state information do not match.

As described above, the state information acquisition unit 341 acquires the voltage information indicating the voltage supplied from the power supply to the on-board unit 300 as the state information. The fault determination unit 243 determines whether voltages indicated by the voltage information match between when the on-board unit 300 is powered off and when the on-board unit 300 is powered on to determine whether reloading of the on-board unit 300 has been performed.

Thus, the on-board unit 300 can have a relatively simple configuration including the voltmeter, thereby reducing the size and manufacturing cost of the on-board unit 300.

Fourth Embodiment

Figure 10:
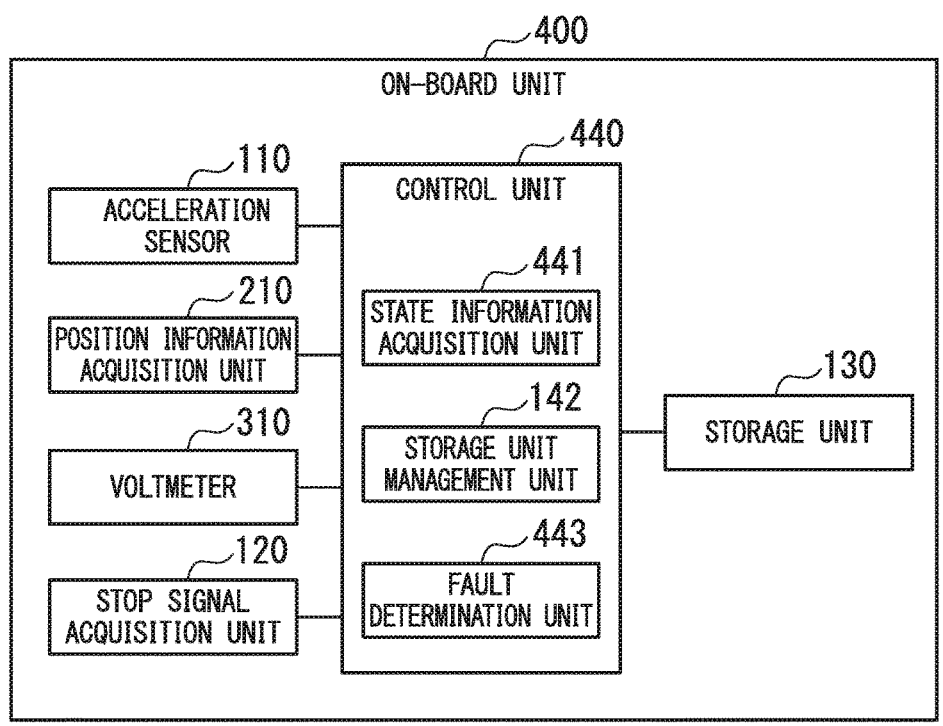
FIG. 10 is a schematic block diagram illustrating a functional configuration of an on-board unit according to a fourth embodiment of the present invention.

FIG. 10 is a schematic block diagram illustrating a functional configuration of an on-board unit in a fourth embodiment of the present invention. In FIG. 10, an on-board unit 400 includes an acceleration sensor 110, a position information acquisition unit 210, a voltmeter 310, a stop signal acquisition unit 120, a storage unit 130, and a control unit 440. The control unit 440 includes a state information acquisition unit 441, a storage unit management nit 142, and a fault determination unit 443. In FIG. 10, portions having the same functions as respective units in FIG. 1, 7, or 9 are denoted with the same reference numerals (110, 120, 130, 142, 210, and 310), and description thereof will be omitted.

The on-board unit 400, similar to the on-board unit 100 (FIG. 1), is an on-board unit that stores information of a vehicle to which the on-board unit 100 is attached and performs a process using the information. On the other hand, the on-board unit 400 is different from the on-board unit 100 in that whether or not the on-board unit 300 has been transferred is determined on the basis of a posture of the on-board unit 400, a position of the vehicle to which the on-board unit 400 is attached, and a voltage supplied from a power supply to the on-board unit 400.

The state information acquisition unit 441, similar to the state information acquisition unit 141 (FIG. 1), acquires state information. In particular, the state information acquisition unit 441 acquires the state information if the stop signal acquisition unit 120 acquires a power off signal and stores the state information in the storage unit 130 via the storage unit management unit 142. Further, the state information acquisition unit 441 acquires the state information if the on-board unit 200 is supplied with power again from a powered off state and starts up, and outputs the state information to the fault determination unit 443. On the other hand, the state information acquisition unit 441 differs from the state information acquisition unit 141 in that the state information acquisition unit 441 acquires posture information of the on-board unit 400, position information of the vehicle to which the on-board unit 400 is attached, and voltage information indicating the voltage supplied from the power supply to the on-board unit 400 as the state information.

The fault determination unit 443 determines whether or not there is a fault on the basis of the state information acquired by the state information acquisition unit 441. The fault determination unit 443, similar to the fault determination unit 143, determines whether or not the state information acquired when the stop signal acquisition unit 120 acquires the power off signal matches state information acquired when the on-board unit 400 starts up. On the other hand, the fault determination unit 443 is different from the fault determination unit 143 in that the posture information of the on-board unit 400, the position information of the vehicle to which the on-board unit 400 is attached, and the voltage information indicating the voltage supplied from the power supply to the on-board unit 400 are used as the state information.

Next, an operation of the on-board unit 400 will be described with reference to FIGS. 11 and 12.

Figure 11:
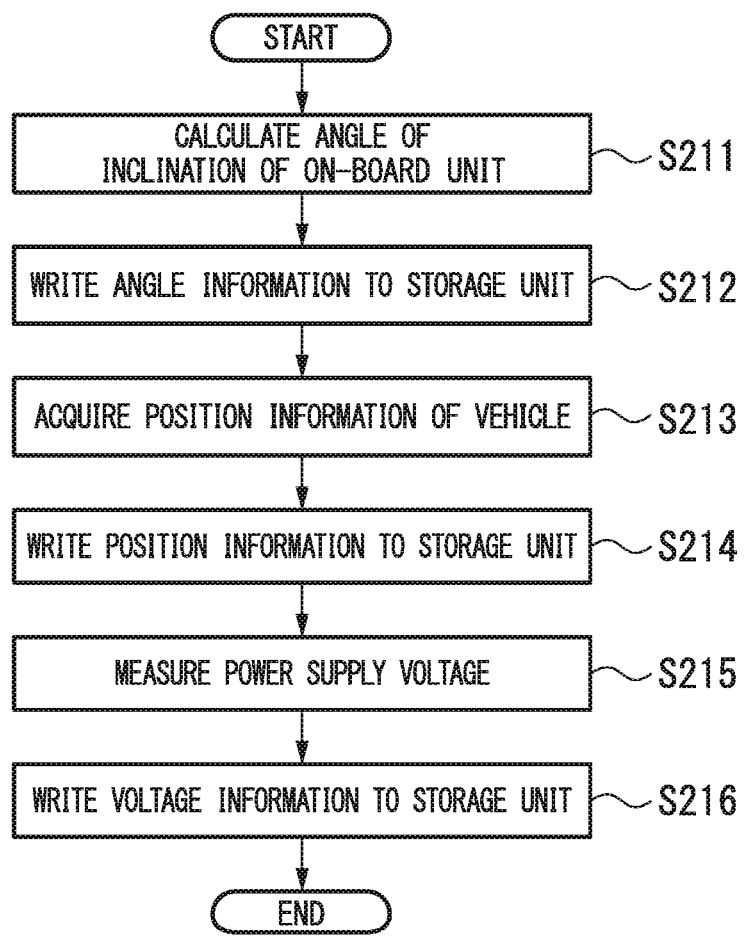
FIG. 11 is a flowchart illustrating a procedure of a process performed by the on-board unit when a supply of power to the on-board unit stops in the embodiment.

FIG. 11 is a flowchart illustrating a procedure of a process that is performed by the on-board unit 400 when a supply of power to the on-board unit 400 stops. The on-hoard unit 400 starts the process of FIG. 11 if the stop signal acquisition unit 120 acquires the power off signal.

Processes of steps S211 to S212 are the same as the processes of steps S111 to S112 (FIG. 5) in the first embodiment. Processes of steps S213 to S214 are the same as the processes of steps S111 to S112 in the second embodiment. Processes of steps S215 to S216 are the same as the processes of steps S111 to S112 in the third embodiment.

After step S216, the process of FIG. 11 ends.

An order of execution of steps S211 to S212, steps S213 to S214, and steps S215 to S216 is arbitrary. For example, steps S213 to S214 or steps S215 to S216 may be executed before steps S211 to S212. Further, steps S211 to S212, steps S213 to S214, and steps S215 to S216 may be executed in parallel.

Figure 12:
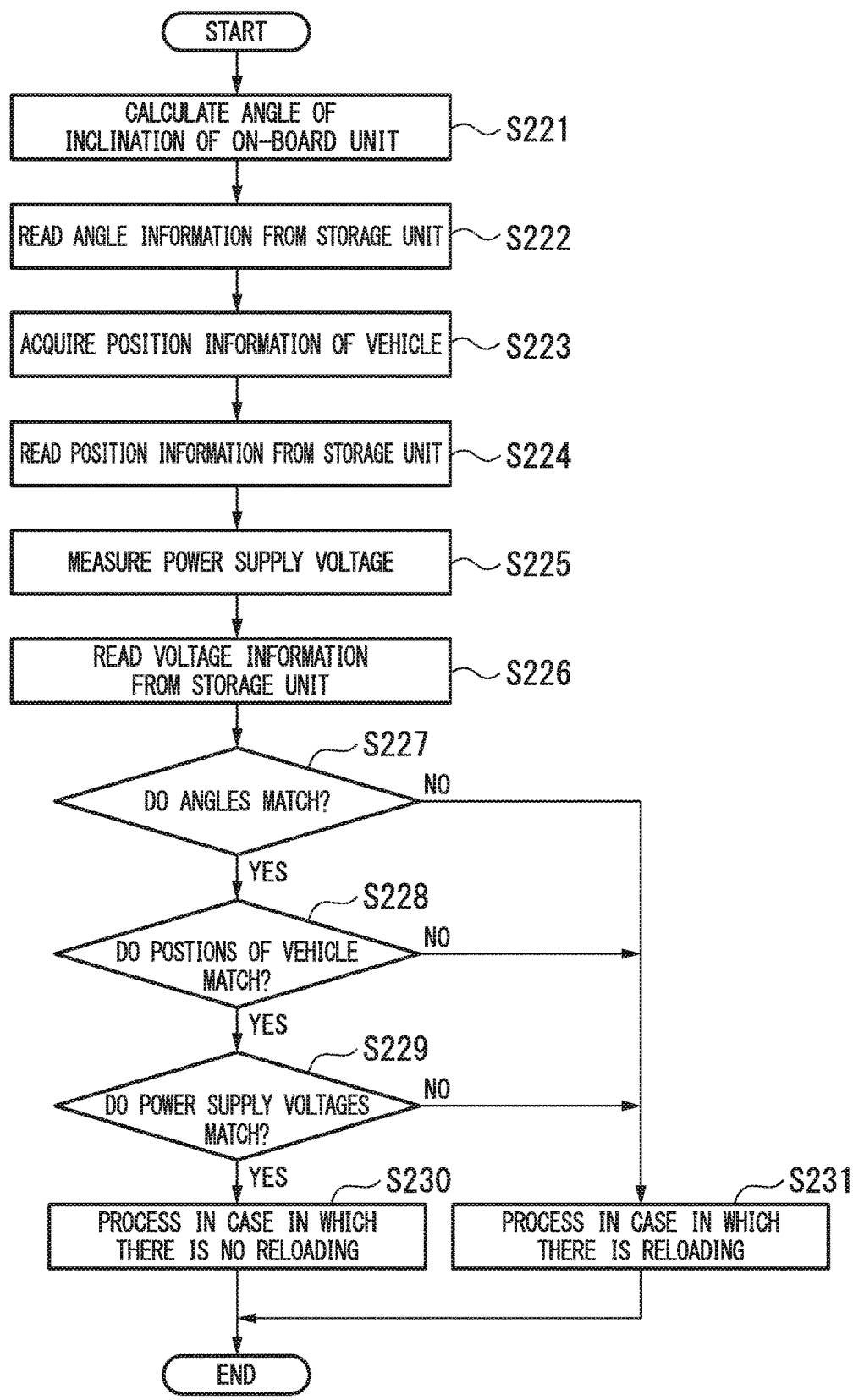
FIG. 12 is a flowchart illustrating a procedure of a process performed by the on-board unit when a supply of power to the on-board unit is resumed in the embodiment.

FIG. 12 is a flowchart illustrating a procedure of a process that is performed by the on-board unit 400 when the supply of power to the on-board unit 400 is resumed. The on-board unit 400 starts the process in FIG. 12 if the on-board unit 400 is supplied with power from the powered off state.

Processes of steps S221 to S222 are the same as the processes of steps S121 to S122 (FIG. 6) in the first embodiment. Processes of steps S223 to S224 are the same as the processes of steps S121 to S122 in the second embodiment. Processes of steps S225 to S226 are the same as the processes of steps S121 to S122 in the third embodiment.

An order of execution of steps S221, S212, S223, S224, S225, and S226 is arbitrary. For example, step S222, S223, S224, S225, or S226 may be executed before step S221. Further, steps S221, S212, S223, S224, S225, and S226 may be executed simultaneously.

A process of step S227 is the same as the process of step S123 (FIG. 6) in the first embodiment. If it is determined in step S227 that the angle obtained in step S221 matches the angle obtained in step S222 (a difference in the angles is smaller than or equal to a threshold value) (step S227: YES), the process proceeds to step S228. On the other hand, if it is determined in step S227 that the angles do not match (the difference is larger than the threshold value) (step S227: NO), the process proceeds to step S231.

A process of step S228 is the same as the process of step S123 in the second embodiment. If it is determined in step S228 that the position obtained in step S223 matches the position obtained in step S224 (a difference in distances is smaller than or equal to a threshold value) (step S228: YES), the process proceeds to step S229. On the other hand, if it is determined in step S228 that the positions do not match (the difference is larger than the threshold value) (step S228: NO), the process proceeds to step S231.

A process of step S229 is the same as the process of step S123 in the third embodiment. If it is determined in step S229 that the voltage value obtained in step S225 matches the voltage value obtained in step S226 (a difference in the voltage values is smaller than or equal to a threshold value) (step S229: YES), the process proceeds to step S230. On the other hand, if it is determined in step S229 that the voltage values do not match (the difference is larger than the threshold value) (step S229: NO), the process proceeds to step S231.

A process of step S230 is the same as the process of step S124 (FIG. 6). After step S230, the process in FIG. 12 ends.

A process of step S231 is the same as the process of step S125 (FIG. 6). After step S231, the process in FIG. 12 ends.

An order of execution of steps S227, S228, and S229 is arbitrary. If the pieces of state information are determined to match in any of steps S227, S228, and S229, the process of step S230 may be executed, and if the pieces of state information are determined not to match in any of steps S227, S228, and S229, the process of step S231 may be executed.

As described above, since the fault determination unit 443 executes a combination of a plurality of determinations, it is possible to reduce the possibility of an erroneous detection in which the on-board unit is determined not to have been transferred despite the on-board unit having been transferred. For example, if a difference between an angle of inclination of the on-board unit 400 acquired before reloading and an angle of inclination of the on-board unit 400 acquired after reloading is small, there is a possibility of the erroneous detection in which the on-board unit is determined not to have been transferred despite the on-board unit having been transferred in a determination using only the posture information of the on-board unit 400. Therefore, since the fault determination unit 443 further performs a determination using the position information about the vehicle to which the on-board unit 400 is attached and a determination using the voltage information about the voltage supplied from the power supply to the on-board unit 400, it is possible to reduce the possibility of the erroneous detection.

The embodiments of the present invention have been described above in detail with reference to the drawings, but a specific configuration is not limited to the embodiments, and design changes or the like that do not depart from the scope of the invention is also included.

INDUSTRIAL APPLICABILITY

The present invention relates to an on-board unit that is attached to a vehicle, stores information about the vehicle, and performs a process using the information about the vehicle, the on-board unit includes a state information acquisition unit that acquires state information indicating a state of the on-board unit, a storage unit management unit that stores the state information in a storage unit when the on-board unit is powered off, and a fault determination unit that determines whether or no state information acquired when the on-board unit is powered on matches the state information stored in the storage unit, and determines a fault when the fault determination unit determines that the state information acquired when the on-board unit is powered on does not match the state information stored in the storage unit.

According to the on-board unit described, use of the on-board unit storing information about the vehicle in another vehicle can be detected without a camera.

REFERENCE SIGNS LIST 100, 200, 300, 400 On-board unit
110 Acceleration sensor
120 Stop signal acquisition unit
130 Storage unit
140, 240, 340, 440 Control unit
141, 241, 341, 441 Stale information acquisition unit
142 Storage unit management unit
143, 243, 343, 443 Fault determination unit
210 Position information acquisition unit
310 Voltmeter

The invention claimed is:

1. A on-board unit that is attached to a vehicle, stores information about the vehicle, and performs a process using the information about the vehicle, the on-board unit comprising:
   a state information acquisition unit that acquires state information indicating a state of the on-board unit;
   a storage unit management unit that stores the state information in a storage unit when the on-board unit is powered off;
   a fault determination unit that determines whether or not state information acquired when the on-board unit is powered on matches the state information stored in the storage unit, and determines a fault when the fault determination unit determines that the state information acquired when the on-board unit is powered on does not match the state information stored in the storage unit; and
   an acceleration sensor,
   wherein the state information acquisition unit acquires a three-dimensional vector indicating an acceleration detected by the acceleration sensor as the state information, and
   the fault determination unit determines a fault when the fault determination unit determines that a sum of a magnitude of change in each of components of the three-dimensional vector between when the on-board unit is powered off and when the on-board unit is powered on is larger than a threshold value.

2. The on-board unit according to claim 1,
   wherein the state information acquisition unit further acquires position information of the on-board unit in a horizontal direction as the state information.

3. The on-board unit according to claim 1,
   wherein the state information acquisition unit further acquires information indicating a height of a position of the on-board unit as the state information.

4. The on-board unit according to claim 1,
   wherein the state information acquisition unit further acquires information indicating a voltage supplied from a power supply to the on-board unit as the state information.

5. The on-board unit according to claim 1,
   wherein
   the state information acquisition unit further acquires information indicating vibration detected by the acceleration sensor as the state information.

6. The on-board unit according to claim 1,
   wherein the on-board unit is attached to a windshield of the vehicle.

7. A fault determination method for an on-board unit that is attached to a vehicle, stores information about the vehicle, and performs a process using the information about the vehicle, the fault determination method comprising:
   a writing step of storing state information indicating a state of the on-board unit in a storage unit when the on-board unit is powered off; and
   a fault determination step of determining whether or not state information acquired when the on-board unit is powered on matches the state information stored in the storage unit, and determining a fault when it is determined that the state information acquired when the on-board unit is powered on does not match the state information stored in the storage unit,
   wherein, in the writing step, a three-dimensional vector indicating an acceleration detected by an acceleration sensor included in the on-board unit is stored in the storage unit as the state information, and
   in the fault determination step, it is determined that there is a fault when it is determined a sum of a magnitude of change in each of components of the three-dimensional vector between when the on-board unit is powered off and when the on-board unit is powered on is larger than a threshold value.

\* \* \* \* \*